(12) United States Patent
Ruhe, Jr.

(10) Patent No.: US 9,994,786 B2
(45) Date of Patent: *Jun. 12, 2018

(54) POLYESTER DISPERSANTS, SYNTHESIS AND USE THEREOF

(71) Applicant: Chevron Oronite Company LLC, San Ramon, CA (US)

(72) Inventor: William Raymond Ruhe, Jr., Benicia, CA (US)

(73) Assignee: Chevron Oronite Company LLC, San Ramon, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 15/210,287

(22) Filed: Jul. 14, 2016

(65) Prior Publication Data

US 2018/0016514 A1    Jan. 18, 2018

(51) Int. Cl.
*C10M 145/22* (2006.01)
*C08G 63/685* (2006.01)
*C10M 159/12* (2006.01)

(52) U.S. Cl.
CPC ....... *C10M 159/12* (2013.01); *C08G 63/6856* (2013.01); *C10N 2230/041* (2013.01); *C10N 2240/102* (2013.01)

(58) Field of Classification Search
CPC .................. C10M 2215/042; C10N 2210/02
USPC ........................................... 508/240
See application file for complete search history.

(56) References Cited

U.S. PATENT DOCUMENTS

| | | | |
|---|---|---|---|
| 3,933,659 A * | 1/1976 | Lyle | C10M 163/00 252/75 |
| 5,352,377 A | 10/1994 | Blain et al. | |
| 8,581,006 B2 | 11/2013 | Gieselman et al. | |

* cited by examiner

*Primary Examiner* — Vishal Vasisth
(74) *Attorney, Agent, or Firm* — Terrence M. Flaherty

(57) ABSTRACT

Disclosed is an oil soluble polyester composition, suitable for use as a dispersant in lubricating oils. The oil soluble polyester composition is prepared by reacting (a) a hydrocarbyl-substituted succinic acylating agent and (b) a dihydroxyalkyl-substituted tertiary amine compound selected from a N,N-di-hydroxyalkyl-substituted tertiary monoamine and a N,N'-di-hydroxyalkyl-substituted tertiary diamine.

30 Claims, No Drawings

POLYESTER DISPERSANTS, SYNTHESIS AND USE THEREOF

TECHNICAL FIELD

This disclosure relates to a novel polyester dispersant additive with soot handling attributes, its synthesis, and its use in lubricants, particularly for reducing soot-induced viscosity increase in heavy duty diesel engine lubricants.

BACKGROUND

Internal combustion engines function by the combustion of fuels which in turn generate the power needed to propel vehicles. In the case of a diesel engine, the fuel is a diesel fuel and the combustion thereof generally results in emissions from the exhausts of such vehicles which comprise three main components: soot and particulate matter, carbon monoxide and nitrogen oxides ($NO_x$). To alleviate environmental concerns, research is ongoing to reduce the levels of these emissions. $NO_x$ emissions can be reduced by lowering the temperature at which the fuel is combusted in the engine. Typically this is achieved by retarding the combustion, i.e., by injecting the fuel shortly after the peak temperature is reached in the cylinder. However, this retarded combustion has the disadvantage that it causes more soot to accumulate in the engine lubricant partly due to incomplete combustion of the fuel because of the lower combustion temperature, and partly due to increased soot deposition on the cylinder wall which is drawn down into the lubricant with the downward stroke of the piston. The presence of soot in the lubricant has the adverse effect of causing viscosity increase and accelerated wear. It is important that soot induced viscosity increase be controlled such that the lubricant stays within viscosity grade in order to maintain its expected performance and to enable quick and clean drainage of the engine during servicing.

Lubricating oil compositions comprise a major amount of base oil and additives that improve the performance and increase the useful life of the lubricant. Nitrogen-containing dispersants are commonly used lubricant additives. The function of a dispersant is to maintain in suspension within the oil, insoluble materials formed by oxidation and other mechanisms during use of the oil, to prevent sludge flocculation and precipitation of the insoluble materials. Another function of the dispersant is to reduce the agglomeration of soot particles, thus reducing increases in the viscosity of the lubricating oil upon use. In the severe environment of diesel engines, it has been found that soot induced viscosity increase cannot be controlled by conventional dispersants, even when the amounts of such conventional dispersants are increased. Therefore, compounds providing potent soot dispersing properties and crankcase lubricants providing improved soot dispersing performance are continuously demanded.

The present disclosure provides a dispersant having improved performance in engine tests, providing a good viscosity index and good soot dispersion and toleration properties, particularly in diesel engines, and especially in heavy duty diesel engines employing exhaust gas recirculation.

SUMMARY

The present disclosure is directed in part to an oil soluble polyester composition which may be added to lubricating oils and contributes to improvements in the viscosity characteristics, the dispersancy and amelioration of soot thickening, and to improving wear characteristics when employed in lubricating oil formulations for mechanical equipment.

In one aspect, there is provided an oil soluble polyester composition which is a reaction product of (a) a hydrocarbyl-substituted succinic acylating agent; and (b) a di-hydroxyalkyl-substituted tertiary amine compound selected from a N,N-di-hydroxyalkyl-substituted tertiary monoamine, a N,N'-di-hydroxyalkyl-substituted tertiary diamine, and combinations thereof.

In another aspect, there is provided a lubricating oil composition comprising a major amount of an oil of lubricating viscosity and a minor amount of any one of the embodiments described herein for the oil soluble polyester composition.

In a further aspect, there is provided an additive concentrate comprising from 80 to 20 wt. % of an organic liquid diluent and from 20 to 80 wt. % of any one of the embodiments described herein for the oil soluble polyester composition.

In yet a further aspect, there is provided a method of improving soot dispersancy in an internal combustion engine which comprises operating the engine with a lubricating oil composition comprising a major amount of oil of lubricating viscosity and an effective amount of any one of the embodiments described herein for the oil soluble polyester composition.

In still yet a further aspect, there is provided a process for preparing an oil soluble polyester composition which comprises reacting a mixture comprising: (i) a hydrocarbyl-substituted succinic acylating agent; and (ii) a di-hydroxyalkyl-substituted tertiary amine compound selected from a N,N-di-hydroxyalkyl-substituted tertiary monoamine, a N,N'-di-hydroxyalkyl-substituted tertiary diamine, and combinations thereof; wherein a charge mole ratio of the di-hydroxalkyl-substituted tertiary amine compound to the hydrocarbyl succinic acylating agent in the mixture is maintained at 0.67 to 1.5:1.

DETAILED DESCRIPTION

Introduction

The following terms will be used throughout the specification and will have the following meanings unless otherwise indicated.

The term "alkyl" refers to a linear or branched saturated monovalent hydrocarbon radical. In certain embodiments, the alkyl is optionally substituted, in one embodiment, with one or more substituents Q. In certain embodiments, the alkyl is a linear saturated monovalent hydrocarbon radical that has 1 to 20 ($C_{1-20}$), 1 to 15 ($C_{1-15}$), 1 to 10 ($C_{1-10}$), 1 to 6 ($C_{1-6}$), or 1 to 3 ($C_{1-3}$) carbon atoms, or branched saturated monovalent hydrocarbon radical of 3 to 20 ($C_{3-20}$), 3 to 15 ($C_{3-15}$), 3 to 10 ($C_{3-10}$), or 3 to 6 ($C_{3-6}$) carbon atoms. As used herein, linear $C_{1-6}$ and branched $C_{3-6}$ alkyl groups are also referred as "lower alkyl." Examples of alkyl groups include methyl, ethyl, propyl (including all isomeric forms), n-propyl, isopropyl, butyl (including all isomeric forms), n-butyl, isobutyl, sec-butyl, tert-butyl, pentyl (including all isomeric forms), and hexyl (including all isomeric forms). For example, $C_{1-6}$ alkyl refers to a linear saturated monovalent hydrocarbon radical of 1 to 6 carbon atoms or a branched saturated monovalent hydrocarbon radical of 3 to 6 carbon atoms.

The term "alkylene" refers to a linear or branched saturated divalent hydrocarbon radical, wherein the alkylene is optionally substituted with one or more substituents Q as described herein. In certain embodiments, the alkylene is a linear saturated divalent hydrocarbon radical that has 1 to 20 ($C_{1-20}$), 1 to 15 ($C_{1-15}$), 1 to 10 ($C_{1-10}$), 1 to 6 ($C_{1-6}$), 1 to 3($C_{1-3}$) carbon atoms, or branched saturated divalent hydrocarbon radical of 3 to 20 ($C_{3-20}$), 3 to 15 ($C_{3-15}$), 3 to 10 ($C_{3-10}$), or 3 to 6 ($C_{3-6}$) carbon atoms. As used herein, linear $C_{1-6}$ and branched $C_{3-6}$ alkylene groups are also referred as "lower alkylene." Examples of alkylene groups include methylene, ethylene, propylene (including all isomeric forms), butylene (including all isomeric forms), pentylene (including all isomeric forms), and hexylene (including all isomeric forms). For example, $C_{1-6}$ alkylene refers to a linear saturated divalent hydrocarbon radical of 1 to 6 carbon atoms or a branched saturated divalent hydrocarbon radical of 3 to 6 carbon atoms.

The term "cycloalkyl" refers to a cyclic saturated and/or non-aromatic unsaturated, bridged and/or non-bridged monovalent hydrocarbon radical. In certain embodiments, the cycloalkyl is optionally substituted, in one embodiment, with one or more substituents Q. In certain embodiments, the cycloalkyl has from 3 to 20 ($C_{3-20}$), from 3 to 15 ($C_{3-15}$), from 3 to 10 ($C_{3-10}$), or from 3 to 7 ($C_{3-7}$) carbon atoms. Examples of cycloalkyl groups include cyclopropyl, cyclobutyl, cyclobutenyl, cyclopentyl, cyclopentenyl, cyclohexyl, cyclohexenyl, cycloheptyl, cycloheptenyl, bicyclo[2.1.1]hexyl, bicyclo[2.2.1]heptyl, decalinyl, and adamantyl.

The term "cycloalkylene" refers to a cyclic divalent hydrocarbon radical, which is optionally substituted with one or more substituents Q as described herein. In one embodiment, the cycloalkylene is saturated or unsaturated but non-aromatic, and/or bridged, and/or non-bridged, and/or fused bicyclic groups. In certain embodiments, the cycloalkylene has from 3 to 20 ($C_{3-20}$), from 3 to 15 ($C_{3-15}$), from 3 to 10 ($C_{3-10}$), or from 3 to 7 ($C_{3-7}$) carbon atoms. Examples of cycloalkylene groups include cyclopropylene (e.g., 1,1-cyclopropylene and 1,2-cyclopropylene), cyclobutylene (e.g., 1,1-cyclobutylene, 1,2-cyclobutylene, or 1,3-cyclobutylene), cyclopentylene (e.g., 1,1-cyclopentylene, 1,2-cyclopentylene, or 1,3-cyclopentylene), cyclohexylene (e.g., 1,1-cyclohexylene, 1,2-cyclohexylene, 1,3-cyclohexylene, or 1,4-cyclohexylene), cycloheptylene (e.g., 1,1-cycloheptylene, 1,2-cycloheptylene, 1,3-cycloheptylene, or 1,4-cycloheptylene), decalinylene, and adamantylene.

The term "aryl" refers to a monocyclic aromatic group and/or multicyclic monovalent aromatic group that contain at least one aromatic hydrocarbon ring. In certain embodiments, the aryl has from 6 to 20 ($C_{6-20}$), from 6 to 15 ($C_{6-15}$), or from 6 to 10 ($C_{6-10}$) ring atoms. Examples of aryl groups include phenyl, naphthyl, fluorenyl, azulenyl, anthryl, phenanthryl, pyrenyl, biphenyl, and terphenyl. The term "aryl" also refers to bicyclic or tricyclic carbon rings, where one of the rings is aromatic and the others of which may be saturated, partially unsaturated, or aromatic, for example, dihydronaphthyl, indenyl, indanyl, or tetrahydronaphthyl (tetralinyl). In certain embodiments, the aryl is optionally substituted, in one embodiment, with one or more substituents Q.

The term "aralkyl" refers to a monovalent alkyl group substituted with one or more aryl groups. In certain embodiments, the aralkyl has from 7 to 30 ($C_{7-30}$), from 7 to 20 ($C_{7-20}$), or from 7 to 16 ($C_{7-16}$) carbon atoms. Examples of aralkyl groups include benzyl, 2-phenylethyl, and 3-phenylpropyl. In certain embodiments, the aralkyl is optionally substituted with one or more substituents Q.

The term "arylene" refers to a monocyclic aromatic group and/or multicyclic divalent aromatic group that contain at least one aromatic hydrocarbon ring. In certain embodiments, the arylene has from 6 to 20 ($C_{6-20}$), from 6 to 15 ($C_{6-15}$), or from 6 to 10 ($C_{6-10}$) ring atoms. Examples of arylene groups include phenylene, naphthylene, fluorenylene, azulenylene, anthrylene, phenanthrylene, pyrenylene, biphenylene, and terphenylene. The term "arylene" also refers to bicyclic or tricyclic carbon rings, where one of the rings is aromatic and the others of which may be saturated, partially unsaturated, or aromatic, for example, dihydronaphthylene, indenylene, indanylene, or tetrahydronaphthylene (tetralinylene). In certain embodiments, the arylene is optionally substituted, in one embodiment, with one or more substituents Q.

The term "heteroaryl" refers to a monovalent monocyclic aromatic group and/or monovalent polycyclic aromatic group that contain at least one aromatic ring, wherein at least one aromatic ring contains one or more heteroatoms independently selected from O, S, and N in the ring. A heteroaryl group is bonded to the rest of a molecule through its aromatic ring. Each ring of a heteroaryl group can contain one or two O atoms, one or two S atoms, and/or one to four N atoms, provided that the total number of heteroatoms in each ring is four or less and each ring contains at least one carbon atom. In certain embodiments, the heteroaryl has from 5 to 20, from 5 to 15, or from 5 to 10 ring atoms. Examples of monocyclic heteroaryl groups include furanyl, imidazolyl, isothiazolyl, isoxazolyl, oxadiazolyl, oxazolyl, pyrazinyl, pyrazolyl, pyridazinyl, pyridyl, pyrimidinyl, pyrrolyl, thiadiazolyl, thiazolyl, thienyl, tetrazolyl, triazinyl, and triazolyl. Examples of bicyclic heteroaryl groups include benzofuranyl, benzimidazolyl, benzoisoxazolyl, benzopyranyl, benzothiadiazolyl, benzothiazolyl, benzothienyl, benzotriazolyl, benzoxazolyl, furopyridyl, imidazopyridinyl, imidazothiazolyl, indolizinyl, indolyl, indazolyl, isobenzofuranyl, isobenzothienyl, isoindolyl, isoquinolinyl, isothiazolyl, naphthyridinyl, oxazolopyridinyl, phthalazinyl, pteridinyl, purinyl, pyridopyridyl, pyrrolopyridyl, quinolinyl, quinoxalinyl, quinazolinyl, thiadiazolopyrimidyl, and thienopyridyl. Examples of tricyclic heteroaryl groups include acridinyl, benzindolyl, carbazolyl, dibenzofuranyl, perimidinyl, phenanthrolinyl, phenanthridinyl, phenazinyl, phenothiazinyl, phenoxazinyl, and xanthenyl. In certain embodiments, the heteroaryl is optionally substituted, in one embodiment, with one or more substituents Q.

The term "heteroarylene" refers to a divalent monocyclic aromatic group and/or divalent polycyclic aromatic group that contain at least one aromatic ring, wherein at least one aromatic ring contains one or more heteroatoms independently selected from O, S, and N in the ring. A heteroarylene group is bonded to the rest of a molecule through its aromatic ring via at least one of the two valencies. Each ring of a heteroarylene group can contain one or two O atoms, one or two S atoms, and/or one to four N atoms, provided that the total number of heteroatoms in each ring is four or less and each ring contains at least one carbon atom. In certain embodiments, the heteroarylene has from 5 to 20, from 5 to 15, or from 5 to 10 ring atoms. Examples of monocyclic heteroarylene groups include furanylene, imidazolylene, isothiazolylene, isoxazolylene, oxadiazolylene, oxazolylene, pyrazinylene, pyrazolylene, pyridazinylene, pyridylene, pyrimidinylene, pyrrolylene, thiadiazolylene, thiazolylene, thienylene, tetrazolylene, triazinylene, and triazolylene. Examples of bicyclic heteroarylene groups include benzofuranylene, benzimidazolylene, benzoisoxazolylene, benzopyranylene, benzothiadiazolylene, benzothiazolylene, benzothienylene, benzotriazolylene, benzoxazolylene, furopyridylene, imidazopyridinylene, imidazothiazolylene, indolizinylene, indolylene, indazolylene, isobenzofuranylene, isobenzothienylene, isoindolylene, isoquinolinylene, isothiazolylene, naphthyridinylene, oxazolopyridinylene, phthalazinylene, pteridinylene, purinylene, pyridopyridylene, pyrrolopyridylene, quinolinylene, quinoxalinylene, quinazolinylene, thiadiazolopyrimidylene, and thienopyridylene. Examples of tricyclic heteroarylene groups include acridinylene, benzindolylene, carbazolylene, dibenzofuranylene, perimidinylene, phenanthrolinylene, phenanthridinylene, phenazinylene, phenothiazinylene, phenoxazinylene, and xanthenylene. In certain embodiments, the heteroarylene is optionally substituted, in one embodiment, with one or more substituents Q.

The term "heterocyclyl" or "heterocyclic" refers to a monovalent monocyclic non-aromatic ring system and/or monovalent polycyclic ring system that contain at least one non-aromatic ring, wherein one or more of the non-aromatic ring atoms are heteroatoms independently selected from O, S, and N; and the remaining ring atoms are carbon atoms. In certain embodiments, the heterocyclyl or heterocyclic group has from 3 to 20, from 3 to 15, from 3 to 10, from 3 to 8, from 4 to 7, from 5 to 20, from 5 to 15, from 5 to 10, from 5 to 8, or from 5 to 6 ring atoms. A heterocyclyl group is bonded to the rest of a molecule through its non-aromatic ring. In certain embodiments, the heterocyclyl is a monocyclic, bicyclic, tricyclic, or tetracyclic ring system, which may be spiro, fused, or bridged, and in which nitrogen or sulfur atoms may be optionally oxidized, nitrogen atoms may be optionally quaternized, and some rings may be partially or fully saturated, or aromatic. Examples of heterocyclic groups include azepinyl, benzodioxanyl, benzodioxolyl, benzofuranonyl, benzopyranonyl, benzopyranyl, benzotetrahydrofuranyl, benzotetrahydrothienyl, benzothiopyranyl, benzoxazinyl, β-carbolinyl, chromonyl, chromonyl, cinnolinyl, coumarinyl, decahydroisoquinolinyl, dihydrobenzisothiazinyl, dihydrobenzisoxazinyl, dihydrofuryl, dihydroisoindolyl, dihydropyranyl, dihydropyrazolyl, dihydropyrazinyl, dihydropyridinyl, dihydropyrimidinyl, dihydropyrrolyl, dioxolanyl, 1,4-dithianyl, furanonyl, imidazolidinyl, imidazolinyl, indolinyl, isobenzotetrahydrofuranyl, isobenzotetrahydrothienyl, isochromanyl, isocoumarinyl, isoindolinyl, isothiazolidinyl, isoxazolidinyl, morpholinyl, octahydroindolyl, octahydroisoindolyl, oxazolidinonyl, oxazolidinyl, oxiranyl, piperazinyl, piperidinyl, 4-piperidonyl, pyrazolidinyl, pyrazolinyl, pyrrolidinyl, pyrrolinyl, quinuclidinyl, tetrahydrofuryl, tetrahydroisoquinolinyl, tetrahydropyranyl, tetrahydrothienyl, thiamorpholinyl, thiazolidinyl, tetrahydroquinolinyl, and 1,3,5-trithianyl. In certain embodiments, the heterocyclyl is optionally substituted, in one embodiment, with one or more substituents Q.

The term "heterocyclylene" refers to a divalent monocyclic non-aromatic ring system or divalent polycyclic ring system that contains at least one non-aromatic ring, wherein one or more of the non-aromatic ring atoms are heteroatoms independently selected from O, S, and N; and the remaining ring atoms are carbon atoms. The heterocyclylene is bonded to the rest of a molecule through the non-aromatic ring. In certain embodiments, the heterocyclylene has from 3 to 20, from 3 to 15, from 3 to 10, from 3 to 8, from 4 to 7, or from 5 to 6 ring atoms. In certain embodiments, the heterocyclylene is a monocyclic, bicyclic, tricyclic, or tetracyclic ring system, which may be fused or bridged, and in which nitrogen or sulfur atoms may be optionally oxidized, nitrogen atoms may be optionally quaternized, and some rings may be partially or fully saturated, or aromatic. The heterocyclylene may be attached to the main structure at any heteroatom or carbon atom which results in the creation of a stable compound. Examples of such heterocyclylene groups include azepinylene, benzodioxanylene, benzodioxolylene, benzofuranonylene, benzopyranonylene, benzopyranylene, benzotetrahydrofuranylene, benzotetrahydrothienylene, benzothiopyranylene, benzoxazinylene, β-carbolinylene, chromanylene, chromonylene, cinnolinylene, coumarinylene, decahydroisoquinolinylene, dihydrobenzisothiazinylene, dihydrobenzisoxazinylene, dihydrofurylene, dihydroisoindolylene, dihydropyranylene, dihydropyrazolylene, dihydropyrazinylene, dihydropyridinylene, dihydropyrimidinylene, dihydropyrrolylene, dioxolanylene, 1,4-dithianylene, furanonylene, imidazolidinylene, imidazolinylene, indolinylene, isobenzotetrahydrofuranylene, isobenzotetrahydrothienylene, isochromanylene, isocoumarinylene, isoindolinylene, isothiazolidinylene, isoxazolidinylene, morpholinylene, octahydroindolylene, octahydroisoindolylene, oxazolidinonylene, oxazolidinylene, oxiranylene, piperazinylene, piperidinylene, 4-piperidonylene, pyrazolidinylene, pyrazolinylene, pyrrolidinylene, pyrrolinylene, quinuclidinylene, tetrahydrofurylene, tetrahydroisoquinolinylene, tetrahydropyranylene, tetrahydrothienylene, thiamorpholinylene, thiazolidinylene, tetrahydroquinolinylene, and 1,3,5-trithianylene. In certain embodiments, the heterocyclylene is optionally substituted with one or more substituents Q as described herein.

The term "hydrocarbyl" is used herein in accordance with the definition specified by the IUPAC: a monovalent group formed by removing a hydrogen atom from a hydrocarbon (i.e., a group containing only carbon and hydrogen).

The term "hydroxyalkyl" refers to a linear or branched alkyl radical having from 2 to 4 carbon atoms, in which one hydrogen atom is replaced by a hydroxyl group. Examples include those with a primary (terminal) hydroxyl group, such as 2-hydroxyethyl, 3-hydroxypropyl, 4-hydroxybutyl, or those with non-terminal hydroxyl groups, such as 1-hydroxyethyl, 1- or 2-hydroxypropyl, 1- or 2-hydroxybutyl, or 1-, 2- or 3-hydroxybutyl.

The term "optionally substituted" is intended to mean that a group or substituent, such as an alkyl, alkenyl, alkynyl, cycloalkyl, aryl, arylene, aralkyl, heteroaryl, heteroarylene, and heterocyclyl group, may be substituted with one or more substituents Q, where each substituent Q is independently selected from, e.g., (a) oxo (═O), halo, cyano, and nitro; (b) $C_{1-6}$ alkyl, $C_{2-6}$ alkenyl, $C_{3-10}$ cycloalkyl, $C_{6-14}$ aryl, $C_{7-15}$ aralkyl, heteroaryl, and heterocyclyl, each of which is further optionally substituted with one or more, in one embodiment, one, two, three, four, or five, substituents $Q^a$; and (c) —C(O)$R^a$, —C(O)O$R^a$, —C(O)N$R^bR^c$, —C(N$R^a$)N$R^bR^c$, —O$R^a$, —OC(O)$R^a$, —OC(O)O$R^a$, —OC(O)N$R^bR^c$, —OC(═N$R^a$)N$R^bR^c$, —OS(O)$R^a$, —OS(O)$_2R^a$, —OS(O)N$R^bR^c$, —OS(O)$_2$N$R^bR^c$, —N$R^bR^c$, —N$R^a$C(O)$R^d$, —N$R^a$C(O)O$R^d$, —N$R^a$C(O)N$R^bR^c$, —N$R^a$C(═N$R^d$)N$R^bR^c$, —N$R^a$S(O)$R^d$, —N$R^a$S(O)$_2R^d$, —N$R^a$S(O)N$R^bR^c$, —N$R^a$S(O)$_2$N$R^bR^c$, —P(O)$R^aR^d$, —P(O)(O$R^a$)$R^d$, —P(O)(O$R^a$)(O$R^d$), —S$R^a$, —S(O)$R^a$, —S(O)$_2R^a$, —S(O)N$R^bR^c$ and —S(O)$_2$N$R^bR^c$, wherein each $R^a$, $R^b$, $R^c$, and $R^d$ is independently (i) hydrogen; (ii) $C_{1-6}$ alkyl, $C_{2-6}$ alkenyl, $C_{3-10}$ cycloalkyl, $C_{6-14}$ aryl, $C_{7-15}$ aralkyl, heteroaryl, or heterocyclyl, each of which is optionally substituted with one or more, in one embodiment, one, two, three, or four, substituents $Q^a$; or (iii) $R^b$ and $R^c$ together with the N atom to which they are attached form heteroaryl or heterocyclyl, optionally substituted with one or more, in one embodiment, one, two, three, or four, substituents $Q^a$. As used herein, all groups that can be substituted are "optionally substituted," unless otherwise specified.

In one embodiment, each substituent $Q^a$ is independently selected from the group consisting of (a) oxo, cyano, halo, and nitro; and (b) $C_{1-6}$ alkyl, $C_{2-6}$ alkenyl, $C_{3-10}$ cycloalkyl, $C_{6-14}$ aryl, $C_{7-15}$ aralkyl, heteroaryl, and heterocyclyl; and (c) —C(O)R$^e$, —C(O)OR$^e$, —C(O)NR$^f$R$^g$, —C(NR$^e$)NR$^f$R$^g$, —OR$^e$, —OC(O)R$^e$, —OC(O)OR$^e$, —OC(O)NR$^f$R$^g$, —OC(=NR$^e$)NR$^f$R$^g$, —OS(O)R$^e$, —OS(O)$_2$R$^e$, —OS(O)NR$^f$R$^g$, —OS(O)$_2$NR$^f$R1g, —NR$^f$R$^g$, —NR$^e$C(O)R$^h$, —NR$^e$C(O)OR$^h$, —NR$^e$C(O)NR$^f$R$^g$, —NR$^e$C(=NR$^h$)NR$^f$R$^g$, —NR$^e$S(O)R$^h$, —NR$^e$S(O)$_2$R$^h$, —NR$^e$S(O)NR$^f$R$^g$, —NR$^e$S(O)$_2$NR$^f$R$^g$, —P(O)R$^e$R$^h$, —P(O)(OR$^e$)R$^h$, —P(O)(OR$^e$)(OR$^h$), —SR$^e$, —S(O)R$^e$, —S(O)$_2$R$^e$, —S(O)NR$^f$R$^g$, and —S(O)$_2$NR$^f$R$^g$; wherein each R$^e$, R$^f$, R$^g$, and R$^h$ is independently (i) hydrogen, $C_{1-6}$ alkyl, $C_{2-6}$ alkenyl, $C_{3-10}$ cycloalkyl, $C_{6-14}$ aryl, $C_{7-15}$ aralkyl, heteroaryl, or heterocyclyl; or (ii) R$^f$ and R$^g$ together with the N atom to which they are attached form heteroaryl or heterocyclyl.

The term "oil-soluble" refers to a material that is soluble in mineral oil to the extent of at least 0.5 gram per liter at 25° C.

The term "polyester" is intended to embrace polymers wherein at least 85% of the recurring units are condensation products of dicarboxylic acids (or derivatives thereof such anhydrides, esters including half-esters, and halides) and dihydroxy compounds with linkages created by formation of ester units.

The term "tertiary amine" means any compound containing nitrogen, wherein the nitrogen itself makes only three single bonds to substituents that are not hydrogen. The nitrogen may be endo- or exocyclic, but not part of an amide, imide, sulfonamide, or sulfinamide.

Number average molecular weights ($M_n$) and molecular weight distribution (MWD=$M_w/M_n$, also referred to as polydispersity index or PDI) were determined by Wyatt Technologies Gel Permeation Chromatography (GPC) system equipped a multi-angle light scattering detector (miniDAWN TREOS), a an interferometric refractometer (Optilab T-rEX), and a differential viscometer (ViscoStar II).

The total base number (TBN) values reported herein were measured according to ASTM D2896. The TBN refers to the amount of strong acid needed to neutralize all of a material's basicity, expressed as mg KOH per gram of sample.

The total acid number (TAN) values reported herein were measured according to ASTM D664. The TAN refers to the number of milligrams of potassium hydroxide (KOH) required to neutralize one gram of material.

Saponification numbers were measured by ASTM D94. The saponification number (SAP) refers to the number of milligrams of potassium hydroxide (KOH) required to saponify 1 g of material.

All ASTM standards referred to herein are the most current versions as of the filing date of the present application.

All concentrations of materials disclosed in this application, unless otherwise specified, are on an "actives" basis; that is, the concentrations reported do not include, e.g., diluent or unreacted starting materials or intermediates.

Hydrocarbyl-Substituted Succinic Acylating Agent

The hydrocarbyl-substituted succinic acylating agent can include succinic acids, anhydrides, esters (including half-esters), and halides. The hydrocarbyl substituent group generally contains an average of at least 8, or 20, or 30, or 35 up to 350, or to 200, or to 100 carbon atoms.

The hydrocarbyl group of the hydrocarbyl-substituted succinic acylating agent may be derived from a polyalkene having a number average molecular weight ($M_n$) of from 500 to 5000 (e.g., from 750 to 3000, or from 900 to 2500). In one embodiment, the polyalkene is polyisobutene (PIB). For example, the hydrocarbyl-substituted succinic acylating agent may be a polyisobutenyl succinic anhydride (PIBSA) in which the polyisobutenyl group has a number average molecular weight ($M_n$) of from 500 to 5000 (e.g., from 750 to 3000, or from 900 to 2500).

The hydrocarbyl-substituted succinic acylating agent may be a have a polyalkylene hydrocarbyl group, which may be linear and contain from 12 to 20 carbon atoms. Representative examples of $C_{12-20}$-hydrocarbyl-substituted succinic acylating agents include dodecenyl succinic anhydride, hexadecenyl succinic anhydride, and octadecenyl succinic anhydride.

When a high molecular weight hydrocarbyl-substituted succinic acylating agent (e.g., PIBSA in which the polyisobutenyl group has a $M_n$ of from 500 to 5000) is used, it may be desirable to add a relatively lower molecular weight $C_{12-20}$-hydrocarbyl-substituted succinic acylating agent (e.g., a one or more of dodecenyl succinic anhydride, hexadecenyl succinic anhydride, and octadecenyl succinic anhydride) to increase the nitrogen content of the resulting oil soluble polyester composition.

Di-Hydroxyalkyl-Substituted Tertiary Amine Compound

The di-hydroxyalkyl-substituted tertiary amine component may be an N,N-di-hydroxyalkyl-substituted tertiary monoamine, an N,N'-di-hydroxyalkyl-substituted tertiary diamines, or a combination thereof.

In one embodiment, the di-hydroxyalkyl-substituted tertiary amine component is an N,N-dihydroxyalkyl-substituted tertiary monoamine having the structure of Formula 1:

(1)

wherein (a) R in each of the x (RO) and they (RO) groups is independently $C_{2-4}$ alkylene; (b) x and y are independently an integer of 1 to 5 (e.g., an integer of 1 or 2); and (c) $R^1$ is selected from $C_{1-20}$ alkyl, $C_{5-20}$ cycloalkyl, $C_{6-20}$ aryl, 5- to 20-membered heteroaryl, and 5- to 20-membered heterocyclyl, and wherein the alkyl, cycloalkyl, aryl, heteroaryl, and heterocyclyl groups are optionally substituted.

Conveniently, R in each of the x (RO) and the y (RO) groups in Formula 1 may be independently ethylene or propylene. For example, R in each of the x (RO) and the y (RO) groups in Formula 1 may be ethylene.

Where $R^1$ in Formula 1 is optionally substituted $C_{1-20}$ alkyl, representative compounds include N,N-bis(2-hydroxyethyl)methylamine, N,N-bis(2-hydroxyethyl)butylamine, N,N-bis(2-hydroxyethyl)cyclohexylamine, and N,N-bis(2-hydroxyethyl)benzylamine.

Where $R^1$ in Formula 1 is optionally substituted $C_{6-20}$ aryl, the N,N-di-hydroxyalkyl-substituted tertiary monoamine may have the structure of Formula 1-A:

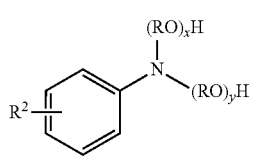

(1-A)

wherein (a) R in each of the x (RO) and the y (RO) groups is independently $C_{2-4}$ alkylene; (b) x and y are independently an integer of 1 to 5 (e.g., an integer of 1 or 2); and (c) $R^2$ is hydrogen, $C_{1-4}$ alkyl, —NH—($C_{6-10}$ aryl), —NH—($C_{7-16}$ aralkyl), —O—($C_{1-4}$ alkyl), —O—($C_{6-10}$ aryl), or —O—($C_{7-16}$ aralkyl). The phenylene, aryl, and aralkyl groups may be optionally substituted.

Conveniently, R in each of the x (RO) and the y (RO) groups in Formula 1-A may be independently ethylene or propylene. For example, R in each of the x (RO) and the y (RO) groups in Formula 1-A may be ethylene.

Representative compounds of Formula 1-A include N,N-bis(2-hydroxyethyl)aniline, N,N-bis(2-hydroxypropyl)aniline, N-(2-hydroxyethyl)-N'-(2-hydroxypropyl)aniline, N-(2-hydroxyethyl)-N'-(2-hydroxybutyl)aniline, N,N-bis(2-hydroxyethyl)-p-toluidine, N,N-bis(2-hydroxypropyl)-p-toluidine, N,N-bis(2-hydroxyethyl)-N'-phenyl-1,3-phenylenediamine, N,N-bis(2-hydroxpropyl)-N'-phenyl-1,3-phenylenediamine, N,N-bis(2-hydroxyethyl)-N'-phenyl-1,4-phenylenediamine, N,N-bis(2-hydroxypropyl)-N'-phenyl-1,4-phenylenediamine, 4-methoxy-N,N-bis(2-hydroxyethyl)aniline, 4-methoxy-N,N-bis(2-hydroxypropyl)aniline, 4-phenoxy-N,N-bis(2-hydroxyethyl)aniline, 4-phenoxy-N,N-bis(2-hydroxypropyl)aniline, 4-benzyloxy-N,N-bis(2-hydroxyethyl)aniline, and 4-benzyloxy-N,N-bis(2-hydroxypropyl)aniline.

Exemplary compounds of Formula 1-A include N,N-bis (2-hydroxyethyl)aniline, N,N-bis(2-hydroxypropyl)aniline, N,N-bis(2-hydroxyethyl)-N'-phenyl-1,4-phenylenediamine, 4-phenoxy-N,N-bis(2-hydroxyethyl)aniline, and 4-benzyloxy-N,N-bis(2-hydroxypropyl)aniline, especially N,N-bis (2-hydroxyethyl)aniline.

In one embodiment, the N,N-di-hydroxyalkyl tertiary monoamine of Formula 1 has the structure of Formula 1-B:

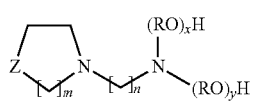

(1-B)

wherein (a) R in each of the x (RO) and the y (RO) groups is independently $C_{2-4}$ alkylene; (b) x and y are independently an integer of 1 to 5 (e.g., an integer of 1 or 2); (c) Z is $CH_2$, O, S, N—($C_{1-4}$ alkyl), or N—($C_{6-10}$ aryl); (d) m is an integer of 1, 2, or 3; and (e) n is an integer of 1 to 6 (e.g., n is an integer of 2 or 3). Suitably, Z may be $CH_2$ or O. The heterocyclyl and aryl groups may be optionally substituted.

Conveniently, R in each of the x (RO) and the y (RO) groups in Formula 1-B may be independently ethylene or propylene. For example, R in each of the x (RO) and they (RO) groups in Formula 1-B may be ethylene.

Representative compounds of Formula 1-B include 2-pyrrolidino-N,N-bis(2-hydroxyethyl)ethylamine, 2-pyrrolidino-N,N-bis(2-hydroxypropyl)ethylamine, 2-piperidino-N,N-bis(2-hydroxyethyl)ethylamine, 2-piperidino-N,N-bis(2-hydroxypropyl)ethylamine, 3-piperidino-N,N-bis(2-hydroxyethyl)propylamine, 3-piperidino-N,N-bis(2-hydroxypropyl)propylamine, 2-morpholino-N,N-bis(2-hydroxyethy)ethylamine, 2-morpholino-N,N-bis(2-hydroxypropyl)ethylamine, 3-morpholino-N,N-bis(2-hydroxyethyl)propylamine, and 3-morpholino-N,N-bis(2-hydroxypropyl)propylamine.

Exemplary compounds of Formula 1-B include 3-morpholino-N,N-bis(2-hydroxyethyl)propylamine and 3-morpholino-N,N-bis(2-hydroxypropyl)propylamine, especially 3-morpholino-N,N-bis(2-hydroxyethyl)propylamine.

In one embodiment, the di-hydroxyalkyl-substituted tertiary amine component is an N,N-dihydroxyalkyl-substituted tertiary monoamine having the structure of Formula 2:

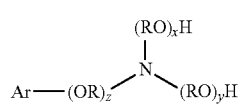

(2)

wherein (a) R in each of the x (RO), y (RO) and z (RO) groups is independently $C_{2-4}$ alkylene; (b) x, y and z are independently an integer of 1 to 5; and (c) Ar is optionally substituted $C_{6-20}$ aryl (e.g., optionally substituted $C_{6-10}$ aryl).

Conveniently, R in each of the x (RO), y (RO) and z (RO) groups in Formula 2 may be independently ethylene or propylene. For example, R in each of the x (RO) and y (RO) groups may be ethylene and R in the z (RO) group may be propylene. In some embodiments, x and y are independently an integer of 1 or 2.

A representative compound of Formula 2 is 2,2'-((1-((1-((1-(naphthalene-2-yloxy)propan-2-yl)oxypropan-2-yl)oxypropan-2-yl)azanediyl)diethanol.

In one embodiment, the hydroxyalkyl-substituted tertiary amine compound is an N,N'-di-hydroxyalkyl-substituted tertiary diamine having the structure of Formula 3:

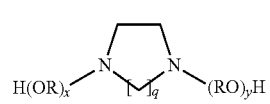

(3)

wherein (a) R in each of the x (RO) and the y (RO) groups is independently $C_{2-4}$ alkylene; (b) x and y are independently an integer of 1 to 5 (e.g., an integer of 1 or 2); and (c) q is an integer of 1, 2, or 3 (e.g., an integer of 2 or 3). The heterocyclyl group may be optionally substituted.

Conveniently, R in each of the x (RO) and the y (RO) groups in Formula 3 may be independently ethylene or propylene. For example, R in each of the x (RO) and the y (RO) groups in Formula 3 may be ethylene.

Representative compounds of Formula 3 include N,N'-bis(2-hydroxyethyl)piperazine, N,N'-bis(2-hydroxpropyl) piperazine, N-(2-hydroxyethyl)-N'-(2-hydroxypropyl)piperazine, N-(2-hydroxyethyl)-N'-(2-hydroxybutyl) piperazine, N,N'-bis(2-hydroxyethyl)homopiperazine, and N,N'-bis(2-hydroxypropyl)homopiperazine, especially N,N'-bis(2-hydroxyethyl)piperazine.

The di-hydroxyalkyl-substituted tertiary amines described herein can be prepared by reaction of an alkylene oxide with a suitable amine by conventional alkoxylation methods known to those skilled in the art.

Polyester Synthesis

The oil soluble polyester composition described herein may be produced by conventional polycondensation techniques. In one embodiment, the di-hydroxyalkyl-substituted tertiary amine and hydrocarbyl-substituted acylating agent components are charged into a conventional polymerization vessel and reacted between 150° C. and 260° C. for a period of from 2 to 20 hours (e.g., 4 to 10 hours). Optionally, an esterification catalyst may be used to decrease the reaction time and/or temperature.

The esterification reaction may be conducted at about atmospheric pressure (about 101 kPa); however, higher or lower pressures can also be used. Water, present in the system or generated by this reaction, may be removed from the reaction system during the course of the reaction via stripping under nitrogen. Reduced pressures can be applied to facilitate the elimination of the water formed during the reaction. It may be desirable to conduct the esterification reaction in an inert organic solvent. Optimum solvents will vary and can be determined from literature sources or routine experiments.

The charge mole ratio (CMR) of di-hydroxyalkyl-substituted tertiary amine compound to hydrocarbyl-substituted succinic acylating agent is maintained at about 0.67 to 1.5:1 (e.g., 0.8 to 1.25:1, or 0.9 to 1.1:1).

The esterification reaction may be conducted in the presence of a polyhydric alcohol such as a poly(oxyalkylene) polyol having from 2 to 15 $C_{2-4}$ alkylene oxide units per molecule (e.g., from 5 to 15 $C_{2-4}$ alkylene oxide units per molecule). Representative poly(oxyalkylene) polyols include polyethylene glycols (e.g., polyethylene glycol 200, polyethylene glycol 300, polyethylene glycol 400, polyethylene glycol 600), polypropylene glycols (e.g., polypropylene glycol 400, polypropylene glycol 725), and polybutylene glycols. When a poly(oxyalkylene) polyol is used, the CMR of [(di-hydroxyalkyl-substituted tertiary amine compound)+(polyhydric alcohol)] to hydrocarbyl-substituted succinic acylating agent is maintained at about 0.67 to 1.5:1 (e.g., 0.8 to 1.25:1, or 0.9 to 1.1:1).

The esterification reaction may be conducted in the presence of an aliphatic dicarboxylic acid having 6 to 20 carbon atoms (e.g., 6 to 12 carbon atoms) and/or an aromatic dicarboxylic acid having 8 to 20 carbon atoms (e.g., 8 to 12 carbon atoms). Representative aliphatic dicarboxylic acids include cyclohexanedicarboxylic acids, adipic acid, pimelic acid, suberic acid, azelaic acid, sebacic acid, undecanedioic acid, and dodecanedioic acid. Representative aromatic dicarboxylic acids include phthalic acid, isophthalic acid, terephthalic acid, naphthalenedicarboxylic acids, and biphenyl-4,4'-dicarboxylic acid. When an aliphatic and/or aromatic dicarboxylic acid is used, the CMR of di-hydroxyalkyl-substituted tertiary amine compound to [(hydrocarbyl-substituted succinic acylating agent)+(dicarboxylic acid)] is maintained at about 0.67 to 1.5:1 (e.g., 0.8 to 1.25:1, or 0.9 to 1.1:1).

Lubricating Oil Additive Concentrate

The oil soluble polyester composition described herein may be provided as an additive package or concentrate in which the oil soluble polyester composition is incorporated into a substantially inert, normally liquid organic diluent such as mineral oil to form an additive concentrate. Typically, a neutral oil having a kinematic viscosity of 4 to 8.5 $mm^2/s$ at 100° C. (e.g., 4 to 6 $mm^2/s$ at 100° C.) will be used as the diluent, though synthetic oils, as well as other organic liquids which are compatible with the additive and finished lubricating oil can also be used.

Typically, the concentrates contain sufficient diluent to make them easy to handle during shipping and storage. These concentrates usually include from 80 to 20 wt. % of an organic liquid diluent and from 20 to 80 wt. % of the oil soluble polyester composition described herein.

Lubricating Oil Compositions

The oil-soluble polyester composition described herein is typically added to a base oil in sufficient amounts to provide soot and/or sludge dispersancy and/or wear control and/or viscosity index improvement when used in lubricating oil compositions for internal combustion engines. Generally, the lubricating oil compositions will contain a major amount of base oil of lubricating viscosity and a minor amount of the oil soluble polyester composition of the present disclosure.

A "major amount" of a base oil refers to a concentration of the base oil within the lubricating oil composition of greater than 50 wt. % (e.g., at least 60 wt. %, at least 70 wt. %, at least 80 wt. %, at least 85 wt. %, at least 90 wt. %, from 80 to 99.95 wt. %, from 80 to 98 wt. %, from 85 to 99.5 wt. %, or from 85 to 98 wt. %).

The amount of the oil-soluble polyester composition in the lubricating oil composition will be in a minor amount compared to the base oil of lubricating viscosity. On an active ingredient basis (i.e., excluding the weight of organic liquid diluent), the lubricating oil composition may comprise from 0.5 to 15 wt. % (e.g., from 1 to 10 wt. %, from 5 to 10 wt. %, or from 5 to 8 wt. %) of the oil soluble polyester composition described herein.

The lubricating oil which may be used herein includes a wide variety of hydrocarbon oils, such as naphthenic bases, paraffin bases and mixed base oils as well as synthetic oils such as esters and the like. The lubricating oils which may be used also include oils from biomass such as plant and animal derived oils. The lubricating oils may be used individually or in combination and generally have a kinematic viscosity which ranges from 3 to 20 $mm^2/s$ at 100° C. Thus, the base oil can be a refined paraffin type base oil, a refined naphthenic base oil, or a synthetic hydrocarbon or non-hydrocarbon oil of lubricating viscosity. The base oil can also be a mixture of mineral and synthetic oils. Mineral oils for use as the base oil herein include, for example, paraffinic, naphthenic and other oils that are ordinarily used in lubricating oil compositions. Synthetic oils include, for example, both hydrocarbon synthetic oils and synthetic esters and mixtures thereof having the desired viscosity. Hydrocarbon synthetic oils may include, for example, oils prepared from the polymerization of ethylene, i.e., polyalphaolefin (PAO), or from hydrocarbon synthesis procedures using carbon monoxide and hydrogen gases such as in a Fisher-Tropsch process. Useful synthetic hydrocarbon oils include liquid polymers of alpha olefins having the proper viscosity. Likewise, alkyl benzenes of proper viscosity, such as didodecyl benzene, can be used. Useful synthetic esters include the esters of monocarboxylic acids and polycarboxylic acids, as well as mono-hydroxy alkanols and polyols. Typical examples are didodecyl adipate, pentaerythritol tetracaproate, di-2-ethylhexyl adipate, dilaurylsebacate, and the like. Complex esters prepared from mixtures of mono and dicarboxylic acids and mono and dihydroxy alkanols can also be used. Blends of mineral oils with synthetic oils are also useful.

The lubricating oil compositions containing the oil soluble polyester additives of this disclosure can be prepared by admixing, by conventional techniques, the appropriate amount of the oil soluble polyester additives of this disclosure with a lubricating oil. The selection of the particular base oil depends on the contemplated application of the lubricant and the presence of other additives.

Additional Additives

If desired, other additives may be included in the lubricating oil and lubricating oil concentrate compositions disclosed herein. These additives include demulsifiers, detergents, dispersants, extreme pressure agents, foam inhibitors, friction modifiers, multifunctional additives, oxidation inhibitors, pour point depressants, rust inhibitors, wear inhibitors, and the like.

Demulsifiers are used to aid the separation of an emulsion. Examples of demulsifiers include block copolymers of polyethylene glycol and polypropylene glycol, polyethoxylated alkylphenols, polyesteramides, ethoxylated alkylphenol-formaldehyde resins, polyvinyl alcohol derivatives and cationic or anionic polyelectrolytes.

Detergents which may be employed herein include alkyl or alkenyl aromatic sulfonates, metal salicylates, calcium phenates, borated sulfonates, sulfurized or unsulfurized metal salts of multi-hydroxy alkyl or alkenyl aromatic compounds, alkyl or alkenyl hydroxy aromatic sulfonates, sulfurized or unsulfurized alkyl or alkenyl naphthenates, metal salts of alkanoic acids, metal salts of an alkyl or alkenyl multi-acid, and chemical and physical mixtures thereof.

Dispersants diffuse sludge, carbon, soot, oxidation products, and other deposit precursors to prevent them from coagulating resulting in reduced deposit formation, less oil oxidation, and less viscosity increase. Examples of dispersants include alkenyl succinimides, alkenyl succinimides modified with other organic compounds, alkenyl succinimides modified by post-treatment with ethylene carbonate or boric acid, alkali metal or mixed alkali metal, alkaline earth metal borates, dispersions of hydrated alkali metal borates, dispersions of alkaline-earth metal borates, polyamide ashless dispersants and the like or mixtures of such dispersants.

Extreme pressure agents are used to prevent sliding metal surfaces from seizing under conditions of extreme pressure. Examples of extreme pressure agents include sulfurized animal or vegetable fats or oils, sulfurized animal or vegetable fatty acid esters, fully or partially esterified esters of trivalent or pentavalent acids of phosphorus, sulfurized olefins, dihydrocarbyl polysulfides, sulfurized Diels-Alder adducts, sulfurized dicyclopentadiene, sulfurized or co-sulfurized mixtures of fatty acid esters and monounsaturated olefins, co-sulfurized blends of fatty acid, fatty acid ester and alpha-olefin, functionally-substituted dihydrocarbyl polysulfides, thia-aldehydes, thia-ketones, epithio compounds, sulfur-containing acetal derivatives, co-sulfurized blends of terpene and acyclic olefins, and polysulfide olefin products, and amine salts of phosphoric acid esters or thiophosphoric acid esters.

Foam inhibitors are used to reduce the foaming tendencies of the lubricating oil. Examples of foam inhibitors include alkyl methacrylate polymers, alkylacrylate copolymers, and polymeric organosiloxanes such as dimethylsiloxane polymers.

Friction modifiers can lower the friction between moving parts. Examples of friction modifiers include fatty alcohols, alkyls, amines, ethoxylated amines, borated esters, other esters, phosphates, phosphites and phosphonates.

Metal deactivators create a film on metal surfaces to prevent the metal from causing the oil to be oxidized. Examples of metal deactivators include disalicylidene propylenediamine, triazole derivatives, thiadiazole derivatives, bis-imidazole ethers, and mercaptobenzimidazoles.

Additives with multiple properties such as anti-oxidant and anti-wear properties may also be added to the lubricating oil. Examples of such multi-functional additives include sulfurized oxymolybdenum dithiocarbamate, sulfurized oxymolybdenum organo phosphorodithioate, oxymolybdenum monoglyceride, oxymolybdenum diethylate amide, amine-molybdenum complexes, and sulfur-containing molybdenum complexes.

Oxidation inhibitors reduce the tendency of mineral oils to deteriorate by inhibiting the formation of oxidation products such as sludge and varnish-like deposits on the metal surfaces. Examples of oxidation inhibitors include (a) phenolic-type oxidation inhibitors, such as 4,4'-methylene-bis (2,6-di-tert-butylphenol), 4,4'-bis(2,6-di-tert-butylphenol), 4,4'-bis(2-methyl-6-tert-butylphenol), 2,2'-methylene-bis(4-methyl-6-tert-butylphenol), 4,4'-butylidene-bis(3-methyl-6-tert-butylphenol), 4,4'-isopropylidene-bis(2,6-di-tert-butylphenol), 2,2'-methylene-bis(4-methyl-6-nonylphenol), 2,2'-isobutylidene-bis(4,6-dimethylphenol), 2,2'-5-methylene-bis(4-methyl-6-cyclohexylphenol), 2,6-di-tert-butyl-4-methylphenol, 2,6-di-tert-butyl-4-ethylphenol, 2,4-dimethyl-6-tert-butyl-phenol, 2,6-di-tert-butyl-dimethylamino-p-cresol, 2,6-di-tert-4-(N,N'-dimethylaminomethylphenol), 4,4'-thiobis(2-methyl-6-tert-butylphenol), 2,2'-thiobis(4-methyl-6-tert-butylphenol), bis (3-methyl-4-hydroxy-5-tert-10-butylbenzyl)-sulfide, and bis (3,5-di-tert-butyl-4-hydroxybenzyl); and (b) diphenylamine-type oxidation inhibitors such as alkylated diphenylamine, phenyl-alpha-naphthylamine, and alkylated-alpha-naphthylamine Other types of oxidation inhibitors include metal dithiocarbamates (e.g., zinc dithiocarbamate), and methylenebis(dibutyldithiocarbamate).

Pour point depressants are polymers that are designed to control wax crystal formation in lubricating oils resulting in lower pour point and improved low temperature flow performance. Examples of pour point depressants include polymethyl methacrylate, ethylene vinyl acetate copolymers, polyethylene polymers, and alkylated polystyrenes.

Rust inhibitors reduce corrosion on materials normally subject to corrosion. Examples of anti-rust agents include nonionic polyoxyethylene surface active agents such as polyoxyethylene lauryl ether, polyoxyethylene higher alcohol ether, polyoxyethylene nonyl phenyl ether, polyoxyethylene octyl phenyl ether, polyoxyethylene octyl stearyl ether, polyoxyethylene oleyl ether, polyoxyethylene sorbitol monostearate, polyoxyethylene sorbitol mono-oleate, and polyethylene glycol mono-oleate. Other compounds useful as anti-rust agents include stearic acid and other alkyls, dicarboxylic acids, metal soaps, alkyl amine salts, metal salts of heavy sulfonic acid, partial carboxylic acid ester of polyhydric alcohol, and phosphoric ester.

Viscosity index improvers, also known as viscosity modifiers, comprise a class of additives that improve the viscosity-temperature characteristics of the lubricating oil, making the oil's viscosity more stable as its temperature changes. Examples of viscosity index improvers include polymethacrylate type polymers, ethylene-propylene copolymers, styrene-isoprene copolymers, hydrated styrene-isoprene copolymers, and polyisobutylene.

EXAMPLES

The following illustrative examples are intended to be non-limiting.

Example 1

A 0.5 L reactor was charged with 47.18 g of N,N-bis(2-hydroxyethyl)-N'-phenyl-1,4-phenylenediamine and 223.65 g of 1000 MW PIBSA (SAP=87.4 mg KOH/g) under a nitrogen atmosphere.

N,N-bis(2-hydroxyethyl)-N'-phenyl-1,4-phenylenediamine has the structure of Formula 4:

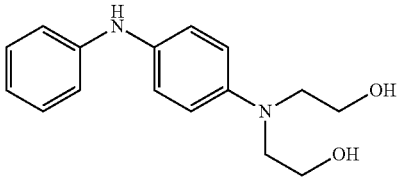

(4)

The mixture was heated to 200° C. and held at that temperature for about 5 hours. A vacuum was then applied at <15 mm Hg for about 1 hour while the temperature was maintained at 200° C.

The product had the following properties: TBN=26.5 mg KOH/g, nitrogen=2.05 wt. %, TAN=6.73 mg KOH/g.

Example 2

A 0.5 L reactor was charged with 50.48 g of 3-morpholino-N,N-bis(2-hydroxyethyl)propylamine and 279.37 g of 1000 MW PIBSA (SAP=87.4 mg KOH/g) under a nitrogen atmosphere.

3-Morpholino-N,N-bis(2-hydroxyethyl)propylamine has the structure of Formula 5:

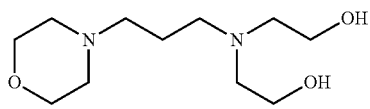

(5)

The mixture was heated to 190° C. and held at that temperature for about 5 hours. A vacuum was then applied at 50 mm Hg for about 30 minutes while the temperature was maintained at 190° C.

The product had the following properties: TBN=69.9 mg KOH/g, nitrogen=1.88 wt. %, TAN=2.55 mg KOH/g, $M_n$=4233, PDI=1.934.

Example 3

A 0.5 L reactor was charged with 51.96 g of N,N-di-(2-hydroxpropyl)-N'-phenyl-1,4-phenylenediamine and 222.09 g of 1000 MW PIBSA (SAP=87.4 mg KOH/g) under a nitrogen atmosphere. The mixture was heated to 190° C. and held at that temperature for about 5 hours. A vacuum was then applied at 35 mm Hg for about 1 hour while the temperature was maintained at 190° C.

The product had the following properties: TBN=30.95 mg KOH/g, nitrogen=1.86 wt. %, TAN=5.31 mg KOH/g, $M_n$=4787, PDI=2.091.

Example 4

A 0.5 L reactor was charged with 22.29 g of N,N-di-(2-hydroxypropyl)-N'-phenyl-1,4-phenylenediamine and 239.96 g of 2300 MW PIBSA (SAP=34.7 mg KOH/g) under a nitrogen atmosphere. The mixture was heated to 190° C. and held at that temperature for about 5 hours. A vacuum was then applied at 20 mm Hg for about 1 hour while the temperature was maintained at 190° C.

The product had the following properties: TBN=13.76 mg KOH/g, nitrogen=0.82 wt. %, TAN=2.89 mg KOH/g, $M_n$=7464, PDI=1.98.

Example 5

A 0.5 L reactor was charged with 21.66 g of 3-morpholino-N,N-bis(2-hydroxyethyl)propylamine and 301.87 g of 2300 MW PIBSA (SAP=34.7 mg KOH/g) under a nitrogen atmosphere. The mixture was heated to 200° C. and held at that temperature for about 5 hours. A vacuum was then applied at 20 mm Hg for about 45 minutes while the temperature was maintained at 200° C.

The product had the following properties: TBN=30.18 mg KOH/g, nitrogen=0.78 wt. %, TAN=1.60 mg KOH/g, $M_n$=7207, PDI=1.97.

Example 6

A 0.5 L reactor was charged with 42.33 g of N,N'-bis(2-hydroxyethyl)piperazine (Sigma-Aldrich) and 311.93 g of 1000 MW PIBSA (SAP=87.4 mg KOH/g) under a nitrogen atmosphere.

N,N'-bis(2-hydroxyethyl)piperazine has the structure of Formula 6:

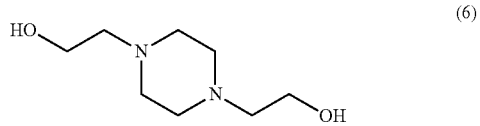 [SMILES: OCCN1CCN(CCO)CC1]

(6)

The mixture was heated to 190° C. and held at that temperature for about 5 hours. A vacuum was then applied at 50 mm Hg for about 1 hour while the temperature was maintained at 190° C.

The product had the following properties: TBN=71.5 mg KOH/g, nitrogen=1.86 wt. %, TAN=2.49 mg KOH/g, $M_n$=2661, PDI=1.378.

Example 7

A 0.5 L reactor was charged with 25.87 g of N,N-bis(2-hydroxypropyl)-N'-phenyl-1,4-phenylenediamine, 34.45 g of 400 MW polypropylene glycol (Alfa Aesar) and 221.14 g of 1000 MW PIBSA (SAP=87.4 mg KOH/g) under a nitrogen atmosphere. The mixture was heated to 190° C. and held at that temperature for about 4 hours. A vacuum was then applied at 50 mm Hg for about 30 minutes while the temperature was maintained at 190° C.

The product had the following properties: TBN=14.13 mg KOH/g, nitrogen=0.89 wt. %, TAN=14.4 mg KOH/g, $M_n$=3698, PDI=1.985.

Example 8

A 0.5 L reactor was charged with 20.74 g of 3-morpholino-N,N-bis(2-hydroxyethyl)propylamine, 35.76 g of 400 MW polypropylene glycol (Alfa Aesar) and 229.55 g of 1000 MW PIBSA (SAP=87.4 mg KOH/g) under a nitrogen atmosphere. The mixture was heated to 190° C. and held at that temperature for about 4 hours. A vacuum was then applied at 50 mm Hg for about 45 minutes while the temperature was maintained at 190° C.

The product had the following properties: TBN=33.84 mg KOH/g, nitrogen=0.86 wt. %, TAN=10.3 mg KOH/g, $M_n$=2836, PDI=1.60.

Example 9

A 0.5 L reactor was charged with 25.65 g of 3-morpholino-N,N-bis(2-hydroxyethyl)propylamine, 44.22 g of 400 MW polyethylene glycol (Sigma-Aldrich) and 283.88 g of 1000 MW PIBSA (SAP=87.4 mg KOH/g) under a nitrogen atmosphere. The mixture was heated to 190° C. and held at that temperature for about 4 hours. A vacuum was then applied at <100 mm Hg for about 35 minutes while the temperature was maintained at 190° C.

The product had the following properties: TBN=33.9 mg KOH/g, nitrogen=0.86 wt. %, TAN=6.96 mg KOH/g, $M_n$=4721, PDI=1.982.

Example 10

A 0.5 L reactor was charged with 43.73 g of N,N-bis(2-hydroxyethyl)aniline (Sigma-Aldrich) and 309.83 g of 1000 MW PIBSA (SAP=87.4 mg KOH/g) under a nitrogen atmosphere. The mixture was heated to 190° C. and held at that temperature for approximately 3 hours. A vacuum was then applied at 50 mm Hg for approximately 30 minutes while the temperature was maintained at 190° C.

The product had the following properties: TBN=36.9 mg KOH/g, nitrogen=0.97 wt. %, TAN=8.22 mg KOH/g, $M_n$=3513, PDI=2.00.

Example 11

A 0.5 L reactor was charged with 51.32 g of 2,2'-((1-((1-((1-(naphthalene-2-yloxy)propan-2-yl)oxypropan-2-yl)oxypropan-2-yl)azanediyl)diethanol and 312.61 g of 1000 MW PIBSA (SAP=90.8 mg KOH/g) under a nitrogen atmosphere.

2,2'-((1-((1-((1-(Naphthalene-2-yloxy)propan-2-yl)oxpropan-2-yl)oxypropan-2-yl)azanediyl)diethanol has the structure of Formula 7:

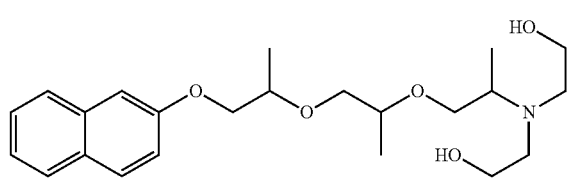

(7)

The mixture was heated to 150° C. and held at that temperature for approximately 1 hour. A second charge of 51.32 g of 2,2'-((1-((1-((1-(naphthalene-2-yloxy)propan-2-yl)oxpropan-2-yl)oxypropan-2-yl)azanediyl)diethanol was added to the reaction mixture. The mixture was heated to 200° C. and held at that temperature for approximately 5 hours. A vacuum was applied at <50 mg Hg for approximately 30 minutes while the temperature was maintained at 200° C.

The product had the following properties: TBN=36.9 mg KOH/g, nitrogen=0.99 wt. %, TAN=3.3 mg KOH/g, $M_n$=6184, PDI=2.56.

Example 12

A 0.5 L reactor was charged with 109.09 g of N,N-bis(2-hydroxyethyl)aniline (Sigma-Aldrich) and heated to 120° C. under a nitrogen atmosphere. Then 82.08 g of dodecenyl succinic anhydride were charged to the reactor over 15 minutes. The reactor was then heated to 200° C., and this temperature was maintained for 2 hours. A vacuum was then applied at 50 mm Hg for about 30 minutes while the temperature was maintained at 200° C. 54.18 g of this intermediate material and 283.58 g of 2300 MW PIBSA (SAP=34.7 mg KOH/g) was charged to another 0.5 L reactor under a nitrogen atmosphere. The mixture was heated to 200° C. and held at that temperature for about 3.7 hours. A vacuum was then applied at 50 mm Hg for about 30 minutes while the temperature was maintained at 200° C.

The product had the following properties: TBN=28.1 mg KOH/g, nitrogen=0.74 wt. %, TAN=5.12 mg KOH/g, $M_n$=5982, PDI=1.815.

Example 13

A 0.5 L reactor was charged with 109.09 g of N,N-bis(2-hydroxyethyl)aniline (Sigma-Aldrich) and heated to 120° C. under a nitrogen atmosphere. Then, 82.08 g of dodecenyl succinic anhydride were charged to the reactor over 15 minutes. The reactor was then heated to 200° C., and this temperature was maintained for 2 hours. A vacuum was then applied at 50 mm Hg for about 30 minutes while the temperature was maintained at 200° C. Then, 82.64 g of this intermediate material and 168.60 g of 1000 MW PIBSA (SAP=89.1 mg KOH/g) were charged to another 0.5 L reactor under a nitrogen atmosphere. The mixture was heated to 200° C. and held at that temperature for about 4 hours. A vacuum was then applied at 50 mm Hg for about 30 minutes while the temperature was maintained at 200° C.

The product had the following properties: TBN=57.24 mg KOH/g, nitrogen=1.53 wt. %, TAN=11.64 mg KOH/g, $M_n$=5008, PDI=2.02.

Baseline Formulation A

A baseline lubricating oil composition was prepared which contained conventional amounts of an oxidation inhibitor package, a calcium-based detergent package containing a phenate and sulfonates, zinc dithiophosphate, viscosity index improver, pour point depressant, foam inhibitor and the balance lube oil.

Example 14

A lubricating oil composition was prepared by adding approximately 6 wt. % of the additive prepared in Example 1 to Baseline Formulation A.

Example 15

A lubricating oil composition was prepared by adding approximately 6 wt. % of the additive prepared in Example 2 to Baseline Formulation A.

Example 16

A lubricating oil composition was prepared by adding approximately 6 wt. % of the additive prepared in Example 3 to Baseline Formulation A.

Example 17

A lubricating oil composition was prepared by adding approximately 6 wt. % of the additive prepared in Example 4 to Baseline Formulation A.

Example 18

A lubricating oil composition was prepared by adding approximately 6 wt. % of the additive prepared in Example 5 to Baseline Formulation A.

Example 19

A lubricating oil composition was prepared by adding approximately 6 wt. % of the additive prepared in Example 6 to Baseline Formulation A.

Example 20

A lubricating oil composition was prepared by adding approximately 6 wt. % of the additive prepared in Example 7 to Baseline Formulation A.

Example 21

A lubricating oil composition was prepared by adding approximately 6 wt. % of the additive prepared in Example 8 to Baseline Formulation A.

Example 22

A lubricating oil composition was prepared by adding approximately 6 wt. % of the additive prepared in Example 9 to Baseline Formulation A.

Example 23

A lubricating oil composition was prepared by adding approximately 6 wt. % of the additive prepared in Example 10 to Baseline Formulation A.

Example 24

A lubricating oil composition was prepared by adding approximately 6 wt. % of the additive prepared in Example 11 to Baseline Formulation A.

Example 25

A lubricating oil composition was prepared by adding approximately 6 wt. % of the additive prepared in Example 12 to Baseline Formulation A.

Example 26

A lubricating oil composition was prepared by adding approximately 6 wt. % of the additive prepared in Example 13 to Baseline Formulation A.

Comparative Example A

A lubricating oil composition was prepared by adding approximately 6 wt. % of a bis-succinimide dispersant derived from polyethyleneamine (Huntsman E-100) and 2300 MW PIB to Baseline Formulation A.

Soot Test

Lubricating oils (Examples 14-26 and Comparative Example A) were evaluated for dynamic viscosity using a soot test, which measures the ability of the formulation to disperse and control viscosity increase resulting from the addition of carbon black, a soot surrogate. In this test, glass tubes were charged with 40 g of lubricating oil and affixed to a condenser. Each oil was heated at 200° C. with 115 mL/min of air flow bubbling through the oil for 8 hours. Then, 0.5 g of VULCAN® XC72R carbon black (Cabot Corporation) was added to 12 g of each oxidized oil. The resulting mixture was heated in a 60° C. oven for 16 hours. After removal from the oven, the mixture was stirred for 1 minute and then homogenized using a paint shaker for 30 minutes to completely disperse the carbon black. The mixture was then heated in a vacuum oven (full vacuum, <25 mm Hg) at 100° C. for 30 minutes. The mixture was removed from the vacuum oven and stirred using a vortex mixer for 30 seconds just prior to measuring viscosity. The dynamic viscosity of each lubricating oil containing carbon black was then measured at 100° C. for 900 seconds at a shear rate of 0.65 $s^{-1}$ on a TA Instruments AR-G2 rheometer using a cone and plate geometry, wherein the cone is stainless steel with a 60 mm diameter and a 2° angle. Sample temperature was controlled with a Peltier plate temperature control system. The dynamic viscosity was calculated as the average dynamic viscosity of the lubricating oil from 600-900 seconds. The results of the soot test are summarized in Table 1. Lower dynamic viscosity indicates improved soot dispersion.

TABLE 1

Soot Test Results

| Example | Dynamic Viscosity, Pascal-sec |
|---|---|
| 14 | 0.027 |
| 15 | 0.285 |
| 16 | 0.027 |
| 17 | 0.026 |
| 18 | 0.752 |
| 19 | 0.429 |
| 20 | 0.024 |
| 21 | 0.363 |
| 22 | 0.025 |
| 23 | 0.301 |
| 24 | 0.100 |
| 25 | 0.369 |
| 26 | 0.043 |
| Comparative A | 0.824 |

As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

All ranges disclosed herein are inclusive of the endpoints and are independently combinable. Whenever a numerical range with a lower limit and an upper limit are disclosed, any number falling within the range is also specifically disclosed.

All documents cited in this application are herein incorporated by reference in their entirety to the extent such disclosure is not inconsistent with this text.

The invention claimed is:

1. An oil soluble polyester composition comprising a reaction product of:
   (a) a hydrocarbyl-substituted succinic acylating agent;
   (b) a di-hydroxyalkyl-substituted tertiary amine compound selected from a N,N-di-hydroxyalkyl-substituted tertiary monoamine, a N,N'-di-hydroxyalkyl-substituted tertiary diamine, and combinations thereof; and
   (c) a poly(oxyalkyene) polyol having from 2 to 15 $C_{2-4}$ alkylene oxide units per molecule.

2. The oil soluble polyester composition of claim 1, wherein the hydrocarbyl-substituted succinic acylating agent comprises a polyisobutenyl succinic anhydride in which the polyisobutenyl group has a number average molecular weight ($M_n$) of from 500 to 5000.

3. The oil soluble polyester composition of claim 2, wherein the hydrocarbyl-substituted succinic acylating agent further comprises a $C_{12-20}$ hydrocarbyl-substituted succinic acylating agent.

4. The oil soluble polyester composition of claim 1, wherein the N,N-di-hydroxyalkyl-substituted tertiary monoamine has the following structure:

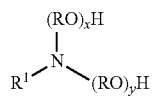

wherein:
   (a) $R^1$ is selected from $C_{1-20}$ alkyl, $C_{5-20}$ cycloalkyl, $C_{6-20}$ aryl, 5- to 20-membered heteroaryl, and 5- to 20-membered heterocyclyl, and wherein the alkyl, cycloalkyl, aryl, heteroaryl, and heterocyclyl groups are optionally substituted;
   (b) R in each of the x (RO) and the y (RO) groups is independently $C_{2-4}$ alkylene; and
   (c) x and y are independently an integer of 1 to 5.

5. The composition of claim 1, wherein the N,N-di-hydroxyalkyl-substituted tertiary monoamine has the following structure:

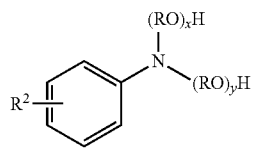

wherein:
   (a) $R^2$ is hydrogen, $C_{1-4}$ alkyl, —NH—($C_{6-10}$ aryl), —NH—($C_{7-16}$ aralkyl), —O—($C_{1-4}$ alkyl), —O—($C_{6-10}$ aryl), or —O—($C_{7-16}$ aralkyl)
   (b) R in each of the x (RO) and the y (RO) groups is independently $C_{2-4}$ alkylene; and
   (c) x and y are independently an integer of 1 to 5.

6. The oil soluble polyester composition of claim 5, wherein the N,N-di-hydroxyalkyl tertiary monoamine is selected from the group consisting of N,N-bis(2-hydroxyethyl)aniline, N,N-bis(2-hydroxypropyl)aniline, N,N-bis(2-hydroxyethyl)-N'-phenyl-1,4-phenylenediamine, 4-phenoxy-N,N-bis(2-hydroxyethyl)aniline, and 4-benzyloxy-N,N-bis(2-hydroxypropyl)aniline, and combinations thereof.

7. The oil soluble polyester composition of claim 6, wherein the N,N-di-hydroxyalkyl tertiary monoamine is N,N-bis(2-hydroxyethyl)aniline.

8. The oil soluble polyester composition of claim 1, wherein the N,N-di-hydroxyalkyl-substituted tertiary monoamine has the following structure:

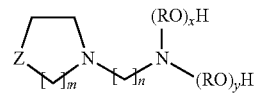

wherein:
   (a) R in each of the x (RO) and the y (RO) groups is independently $C_{2-4}$ alkylene;
   (b) x and y are independently an integer of 1 to 5;
   (c) Z is $CH_2$, O, S, N—($C_{1-4}$ alkyl), or N—($C_{6-10}$ aryl);
   (d) m is an integer of 1 to 3; and
   (e) n is an integer of 1 to 6.

9. The oil soluble polyester composition of claim 8, wherein the N,N-di-hydroxyalkyl-substituted tertiary monoamine is selected from the group consisting of 2-pyrrolidino-N,N-bis(2-hydroxyethyl)ethylamine, 2-pyrrolidino-N,N-bis(2-hydroxypropyl)ethylamine, 2-piperidino-N,N-bis(2-hydroxyethyl)ethylamine, 2-piperidino-N,N-bis(2-hydroxypropyl)ethylamine 3-piperidino-N,N-bis(2-hydroxyethyl)propylamine, 3-piperidino-N,N-bis(2-hydroxypropyl)propylamine, 2-morpholino-N,N-bis(2-hydroxyethyl)ethylamine, 2-morpholino-N,N-bis(2-hydroxypropyl)ethylamine, 3-morpholino-N,N-bis(2-hydroxyethyl)propylamine, and 3-morpholino-N,N-bis(2-hydroxypropyl)propylamine, and combinations thereof.

10. The oil soluble polyester composition of claim 9, wherein the N,N-di-hydroxyalkyl-substituted tertiary monoamine is 3-morpholino-N,N-bis(2-hydroxyethyl)propylamine.

11. The oil soluble polyester composition of claim 1, wherein the N,N-di-hydroxyalkyl-substituted tertiary monoamine has the following structure:

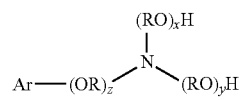

wherein:
   (a) R in each of the x (RO), y (RO) and z (RO) groups is independently $C_{2-4}$ alkylene;
   (b) x, y and z are independently an integer of 1 to 5; and
   (c) Ar is optionally substituted $C_{6-20}$ aryl.

12. The oil soluble polyester composition of claim 11, wherein the N,N-di-hydroxyalkyl-substituted tertiary monoamine has the following structure:

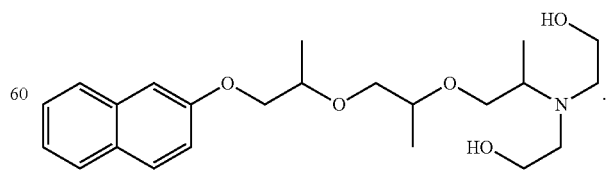

13. The oil soluble polyester composition of claim 1, wherein the N,N'-di-hydroxyalkyl-substituted tertiary diamine has the following structure:

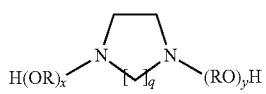

wherein:
(a) R in each of the x (RO) and the y (RO) groups is independently C$_{2-4}$ alkylene; and
(b) q is an integer of 1, 2, or 3.

14. The oil soluble polyester composition of claim 13, wherein the N,N'-di-hydroxyalkyl-substituted tertiary diamine is selected from the group consisting of N,N'-bis(2-hydroxyethyl)piperazine, N,N'-bis(2-hydroxypropyl)piperazine, N-(2-hydroxyethyl)-N'-(2-hydroxypropyl)piperazine, N-(2-hydroxyethyl)-N'-(2-hydroxybutyl)piperazine, N,N'-bis(2-hydroxyethyl)homopiperazine, N,N'-bis(2-hydroxypropyl)homopiperazine, and combinations thereof.

15. The oil soluble polyester composition of claim 14, wherein the N,N'-di-hydroxyalkyl-substituted tertiary diamine is N,N'-bis(2-hydroxyethyl)piperazine.

16. An oil soluble polyester composition as in any one of claims 4, 5, 8 11, and 13, in which R in each of the x (RO) and the y (RO) groups is independently selected from ethylene and propylene.

17. An oil soluble polyester composition as in any one of claims 4, 5, 8 11, and 13, in which x is an integer of 1 and y is an integer of 1.

18. The oil soluble polyester composition of claim 1, wherein the poly(oxyalkylene) polyol has from 5 to 15 C$_{2-4}$ alkylene oxide units per molecule.

19. The oil soluble polyester composition of claim 1, wherein the reaction product further comprises an aliphatic dicarboxylic acid having 6 to 20 carbon atoms, an aromatic dicarboxylic acid having 8 to 20 carbon atoms, or a combination thereof.

20. A lubricating oil composition comprising (a) a major amount of an oil of lubricating viscosity and (b) from 0.05 to 15 wt. %, based on the total weight of the lubricating oil composition, of the oil soluble polyester composition of claim 1.

21. The lubricating oil composition of claim 20, further comprising at least one additive selected from the group consisting of demulsifiers, detergents, dispersants, extreme pressure agents, foam inhibitors, friction modifiers, multifunctional additives, oxidation inhibitors, pour point depressants, rust inhibitors, and wear inhibitors.

22. A lubricating oil additive concentrate comprising from 80 to 20 wt. % of an organic liquid diluent and from 20 to 80 wt. % of the oil soluble polyester composition of claim 1.

23. A method for controlling soot-induced viscosity increase experienced in diesel engine lubricating oils during use in diesel engines, the method comprising employing as the diesel engine lubricating oil the lubricating oil composition of claim 20.

24. A method of improving soot dispersancy in an internal combustion engine which comprises operating the engine with a lubricating oil composition comprising a major amount of oil of lubricating viscosity and an effective amount of the oil soluble polyester composition of claim 1.

25. A process for preparing an oil soluble polyester composition which comprises reacting a mixture comprising:
(i) a hydrocarbyl-substituted succinic acylating agent;
(ii) a di-hydroxyalkyl-substituted tertiary amine compound selected from a N,N-di-hydroxyalkyl-substituted tertiary monoamine, a N,N'-di-hydroxyalkyl-substituted tertiary diamine, and combinations thereof; and
(c) a poly(oxyalkyene) polyol having from 2 to 15 C$_{2-4}$ alkylene oxide units per molecule;
wherein a charge mole ratio of the di-hydroxyalkyl-substituted tertiary amine compound and poly(oxyalkylene) polyol to the hydrocarbyl succinic acylating agent in the mixture is maintained at 0.67 to 1.5:1.

26. The process of claim 25, wherein the mixture is maintained at a temperature of 150° C. to 260° C.

27. The process of claim 25, wherein the hydrocarbyl-substituted succinic acylating agent comprises a polyisobutenyl succinic anhydride in which the polyisobutenyl group has a number average molecular weight ($M_n$) of from 500 to 5000.

28. The process of claim 25, wherein the poly(oxyalkylene)polyol is selected from one or more of polyethylene glycol 200, polyethylene glycol 300, polyethylene glycol 400, polyethylene glycol 600, polypropylene glycol 400, and polypropylene glycol 725.

29. The oil soluble polyester composition of claim 1, wherein the poly(oxyalkylene) polyol is selected from one or more of polyethylene glycol 200, polyethylene glycol 300, polyethylene glycol 400, polyethylene glycol 600, polypropylene glycol 400, and polypropylene glycol 725.

30. The process of claim 25, wherein the poly(oxyalkylene) polyol has from 5 to 15 C$_{2-4}$ alkylene oxide units per molecule.

* * * * *